(12) United States Patent
Gross

(10) Patent No.: US 7,611,161 B2
(45) Date of Patent: Nov. 3, 2009

(54) METHODS AND APPARATUS FOR MANUALLY PROPELLING A GOLF PULL CART

(76) Inventor: William L. Gross, 4540 Catskill, Galesburg, MI (US) 49053

( * ) Notice: Subject to any disclaimer, the term of this patent is extended or adjusted under 35 U.S.C. 154(b) by 139 days.

(21) Appl. No.: 11/625,513

(22) Filed: Jan. 22, 2007

(65) Prior Publication Data
US 2008/0174090 A1 Jul. 24, 2008

(51) Int. Cl.
- B62B 1/00 (2006.01)
- B62B 3/00 (2006.01)
- B62B 9/00 (2006.01)
- B62D 51/04 (2006.01)
- B62K 27/12 (2006.01)

(52) U.S. Cl. .............. 280/646; 280/1.5; 280/288.4; 280/290; 280/292; 280/656; 280/657

(58) Field of Classification Search ............ 280/646, 280/1.5, 288.4, 290, 292, 47.131, 656, 657
See application file for complete search history.

(56) References Cited

U.S. PATENT DOCUMENTS

| | | | |
|---|---|---|---|
| 3,328,043 A | 6/1967 | Johnson | |
| 4,106,583 A | 8/1978 | Nemeth | |
| 5,106,117 A | 4/1992 | Wang | |
| 5,112,068 A | 5/1992 | Liao et al. | |
| 5,622,294 A | 4/1997 | Evans | |
| 6,098,993 A * | 8/2000 | Bellinson | 280/1.5 |
| 6,131,917 A | 10/2000 | Walsh | |
| 6,349,949 B1 * | 2/2002 | Gorringe | 280/1.5 |
| 6,431,556 B1 | 8/2002 | Beardsley et al. | |
| 6,564,802 B1 | 5/2003 | Kraeft, Sr. | |
| 6,641,228 B2 | 11/2003 | Liu | |
| 6,659,208 B2 | 12/2003 | Gaffney et al. | |
| 6,942,238 B1 | 9/2005 | DeCarlo | |
| 7,311,313 B1 * | 12/2007 | Ray et al. | 280/1.5 |
| 2001/0040350 A1 | 11/2001 | Allen et al. | |
| 2006/0021114 A1 | 2/2006 | Engel | |
| 2006/0055128 A1 * | 3/2006 | Scott et al. | 280/1.5 |
| 2008/0018063 A1 * | 1/2008 | Morowat | 280/1.5 |

OTHER PUBLICATIONS

International Search Report of PCT/US08/51134; Sep. 9, 2008; 7 pages.

* cited by examiner

*Primary Examiner*—Christopher P Ellis
*Assistant Examiner*—John R Olszewski
(74) *Attorney, Agent, or Firm*—Armstrong Teasdale LLP

(57) ABSTRACT

Apparatus and methods for propelling a multiple-wheeled golf bag cart over a terrain are described. In one embodiment, the apparatus is configured to be attached to a handle of the golf bag cart and further configured to be attached to the waist of a golfer. The apparatus includes a belt member for attachment to the waist of the golfer, a deformable member configured to be disposed between the cart handle and the belt member for controlling movement of the cart while the cart is being towed, and a mounting member for attachment to the handle for connecting the deformable member to the handle.

44 Claims, 14 Drawing Sheets

METHODS AND APPARATUS FOR MANUALLY PROPELLING A GOLF PULL CART

BACKGROUND OF THE INVENTION

This invention relates generally to the field of the sport of golf, and more particularly, to methods and apparatus for manually propelling golf bag carts utilized for carrying golf bags. More specifically, this invention relates to a new and novel apparatus and methods for manually transporting a golf bag cart in a manner which controls movement of the golf bag cart in three axes. The apparatus and methods further provide a dampening and absorption of shock and vibration between the cart and the golfer emanating from contact between the cart and the terrain over which the cart is being transported. The apparatus and methods further provide a dampening and absorption of shock and vibration emanating from variations in the pulling force exerted by the golfer on the cart.

The sport of golf has enjoyed a tremendous upswing in popularity over the last several decades. This popularity has pushed suppliers to the golf industry to innovate at a rate seemingly unprecedented in the sport of golf. Innovation has extended not only to golf balls and golf clubs but to other accessory equipment including, for example, manually transported golf bag carts carrying golf bags. Traditionally, manual golf bag carts have had two wheels attached to golf bag supporting structure upon which a golf bag was placed. When the golf bag cart was not being transported, the supporting structure rested on the ground. To move the cart, the golfer tipped the cart by means of a handle attached to the supporting structure. Thus, the golfer supported part of the weight of the golf bag cart while pulling the cart forward. However, supporting a portion of the weight over a length of the golf course tends to fatigue the golfer.

While it was very common for the golfer to pull the golf bag cart by directly gripping the handle and walking forward, several attempts have been made to free up the golfer's hands by linking an apparatus to the handle of the golf bag cart and then to the waist of the golfer whereby the golfer could pull the cart via the linking apparatus. These attempts were intended to reduce stress and fatigue resulting from pulling of the golf bag cart using the hand and arm muscles.

In one example, a belt type harness is connected at one of its ends to the handles of a two-wheeled golf bag cart. The other end of the harness is secured around the waist of the golfer. However, this configuration does not permit control of the motion of the cart along any axis, either from side to side, or up or down or in the direction of travel. Indeed, the cart is free to swerve side-to-side if the cart is on a side-slope of a hill. The cart may also ride up onto the heels or back of the golfer if the cart is on a downward slope of a hill. Moreover, as the golfer pulls the cart over the terrain, which may be uphill, downhill or along the side of a hill, the golfer's variation in gait results in variation in the force used by the golfer to pull the cart. Moreover, variation in the instantaneous momentum of the cart results in variation of the force applied by the cart to the golfer. Accordingly, as the golfer pulls the cart, all of these variations result in the cart alternately being pulled by the golfer and then pushing the golfer. In simple terms, the cart alternately exerts a pulling and pushing force on the golfer as the golfer walks forward. The result is that this configuration affords virtually no control of movement of the cart nor of the forces between the cart and the golfer.

In another example, a connector rod is provided where one end is attached to a two-wheeled the golf bag cart and the other end is hooked through an eyelet extending from a belt worn by the golfer. As in the example described above, this configuration does not provide any control of side-to-side-movement of the cart and does not provide control of movement along the line of travel. Moreover, this configuration does not include any mechanisms for dampening or absorbing shock or vibration as the golfer tows the cart.

A further example includes an apparatus that is mounted to a two-wheeled golf bag cart. The apparatus wraps around the golfer and then attaches to the golf bag cart. This enables the golfer to push the cart with his or her arms extending forward by pushing on a long transverse member passing in front of the golfer. Alternatively, the golfer may pull the cart by hooking the long transverse member onto a belt mounted pulling assembly attached to a belt worn by the golfer. The pulling assembly includes clips that hold the cart handle. The pulling assembly includes a pad that may be formed of resilient rubber or resilient plastic with stiffeners made of aluminum, steel or spring steel. The resilient molded pad is intended for the comfort of the golfer since it is in direct contact with the golfer's back. However, this configuration provides no control of the movement of the golf bag cart nor any dampening or absorption of shock and vibration.

These and other known devices suffer from a multitude of deficiencies. As mentioned above, such devices intended to permit pulling of the golf bag cart with out use of the golfer's hands fail to provide control of undesirable movement of the cart and fail to provide dampening or absorption of shock and vibration. Uneven or bumpy terrain may skew the cart away from the intended direction or may even result in an overturning of the cart. Similarly, when the golfer is effecting a turn while pulling the cart, the cart may, if the turn is to tight, bind up behind the golfer in the same way a trailer may jack-knife behind a tractor. When pulling the cart down hill, the cart can tend to overrun the golfer, for example, due to the uneven terrain slope. Even the irregular nature of a normal golfer's gait can result in the cart alternately pulling on the golfer and pushing on the back of the golfer with every step. Shock waves resulting from these alternate puling and pushing forces are often annoying and fatiguing enough to affect the golfer's ability to play golf.

Moreover, various apparatus attached to the cart and the torso of the golfer to permit pulling of the cart with out use of the golfer's hands, for example via a rod or other structure, interferes with normal pulling of the cart directly by its handle. In other words, the apparatus interferes with golfer's normal grip on the cart handle. Thus, it is difficult for the golfer, in the course of a round of golf, to alternatively pull the cart not only directly by the hands and but also via apparatus secured to the torso of the golfer. Similarly, many known devices fail to provide for quickly disconnecting such a pulling apparatus from the golf bag cart.

Known devices intended to permit pulling of the golf bag, without use of the golfer's hands, through apparatus attached to the golfer's waist fail to provide for distribution of the shock and vibration loads. While some such devices provide a foam pad between the golfer's back and a belt attached to the cart, foam pads are insufficient to provide a comfortable interface between the golfer and the belt.

Within the last decade, in order to lessen fatigue on the golfer, golf bag cart innovation has resulted in the development of a three-wheeled golf bag cart. In this configuration, three wheels are attached to the golf bag supporting structure and no part of the supporting structure rests on the ground. To move the cart, there is no need to tip the cart and the golfer simply pushes the cart forward on all three wheels without bearing any of the direct weight of the bag. This configuration went a long way in reducing golfer fatigue but it did not eliminate all fatigue resulting from transporting a golf bag cart and bag.

Even with today's three-wheeled golf bag carts that support the entire weight of the golf bag cart, a golfer can encounter muscle fatigue. Pushing the cart over the entire length of a 5000-yard or greater golf course can fatigue the golfer's forearms, biceps, triceps and shoulders. Fatigue of these muscles can be detrimental to the golfers ability to effect a lower score. In addition, while the golfer is pushing a golf bag cart, the golfer's hands are occupied and not free for other tasks such as marking a score card or cleaning clubs or golf balls. Many of the same deficiencies of apparatus intended to pull/push a two-wheeled golf bag cart are present in the pulling and/or pushing of a three-wheeled golf bag cart.

BRIEF DESCRIPTION OF THE INVENTION

In one aspect, an apparatus for towing a multiple-wheeled golf bag cart over a terrain is provided. The apparatus is configured to be attached to a handle of the golf bag cart and further configured to be attached to the waist of a golfer. The apparatus includes a belt member for attachment to the waist of the golfer, a deformable member configured to be disposed between the cart handle and the belt member for controlling movement of the cart while the cart is being towed, and mounting members for attachment to the handle for connecting the deformable member to the handle.

In another aspect, an apparatus for towing a multiple-wheeled golf bag cart over terrain is provided. In use, the apparatus is attached to a handle of the cart and also attached to the waist of a golfer. The apparatus includes a belt member configured for attachment to the waist of the golfer, a device configured to be disposed between the cart handle and the belt member for controlling movement of the cart while the cart is being towed, and a member configured for attachment to the handle for mounting the device to the handle.

In still another aspect, a belt for towing a multiple-wheeled device over terrain is provided. The belt is configured to be attached to a handle of the device and includes a belt member configured to be attached to the waist of a user, and having an opening formed therein, and a belt engaging member comprising a base at a first end and a coupling device proximate a second end. The belt engaging member is configured for insertion through the opening in the belt member.

In yet another aspect, a belt engaging device is provided. The device is configured for insertion through an opening formed in a belt and for attachment to a golf bag cart handle for the towing of a multiple-wheeled golf bag cart over terrain. The belt engaging device includes a first end defining a base, the base enlarged to engage the belt about a perimeter defined by the opening formed in the belt, and a second end further comprising a coupling device, for attachment to the golf bag cart handle. The belt engaging device includes a deformable material for controlling movement of the cart while the cart is being towed and dampening forces transmitted between the cart and a user wearing the belt.

In another aspect, an interface between a belt to be worn by a user and a golf bag cart handle is provided. The interface includes a belt engaging device, a first end of the belt engaging device configured to engage the belt, a second end of the belt engaging device configured to extend toward the golf bag cart handle, and a coupling device configured to extend from the second end of the belt engaging device to provide an attachment to the golf bag cart handle. The belt engaging device is fabricated from a material for dampening forces transmitted between the golf bag cart handle and a user wearing the belt.

DETAILED DESCRIPTION OF THE INVENTION

Methods and apparatus described herein facilitate alleviating arm and upper body fatigue associated with propelling a multiple-wheeled golf bag cart over a golf course. The methods and apparatus described below in detail, as compared to simply pulling or pushing a golf cart by hand, facilitate using different larger muscles of the body, such as the thigh, calf and lower torso muscles for propelling the golf cart. More particularly, the methods and apparatus described herein include apparatus that may be attached to the golfer enabling the golfer to pull the multiple-wheeled cart without use of the golfer's hands when the arm and shoulder muscles are fatigued. Such apparatus do not interfere with normal pushing of the golf bag cart by the golfer. The golfer may therefore alternate between pushing and pulling the multiple-wheeled cart and thus different muscles may alternately be used and then rested so as to lessen fatigue of any single muscle set of the golfer. Further benefits of the herein described embodiments are the control of unintended movement of a multiple-wheeled golf bag cart as the golfer pulls the cart forward and dampening of forces transmitted between the cart and the golfer.

Figure 1:
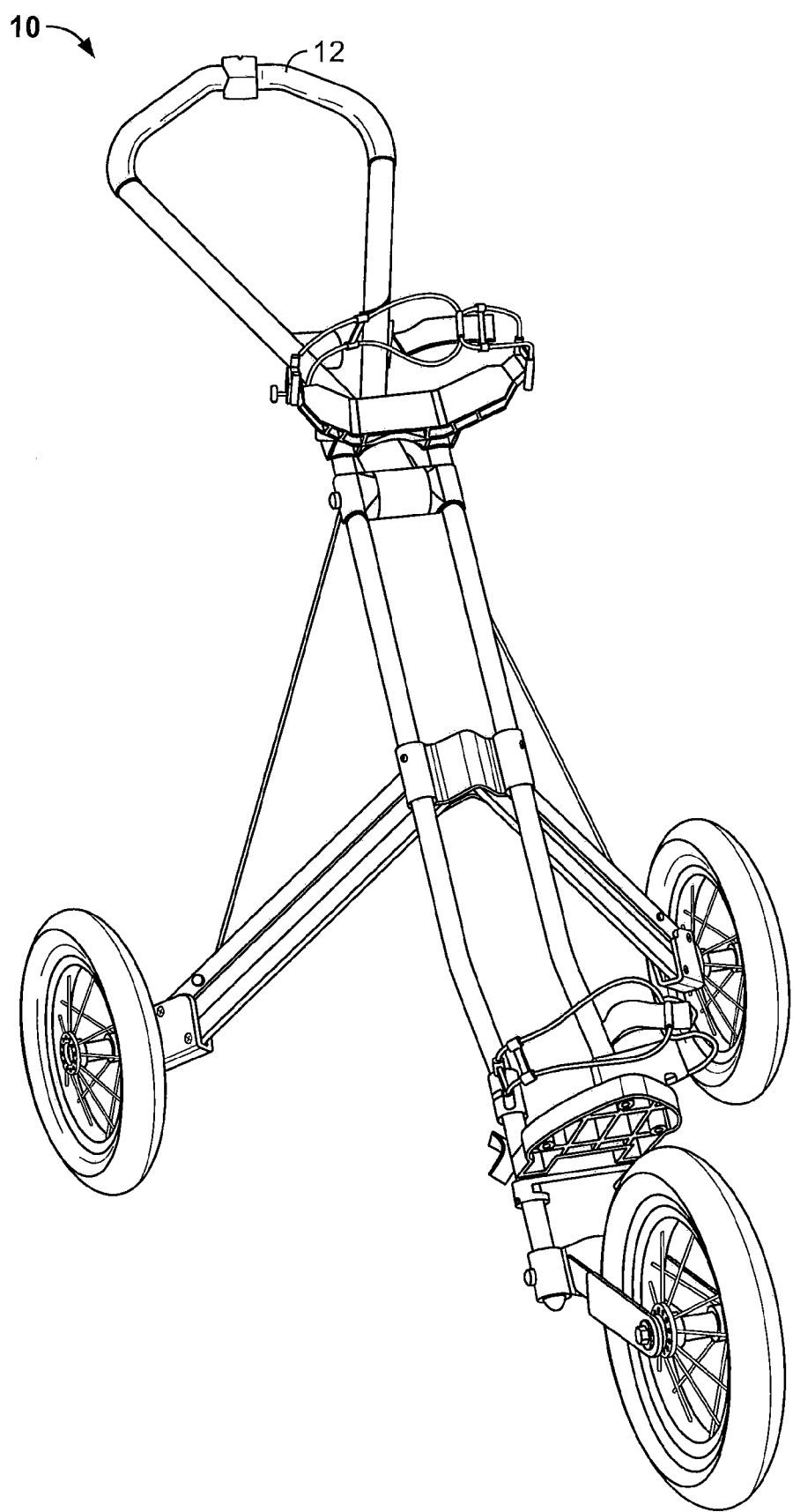
FIG. 1 is an illustration of a golf bag cart.

FIG. 1 is an illustration of a golf bag cart 10. While cart 10 is illustrated as a three wheeled device, it is known that carts using fewer than three wheels exist, and it is contemplated that configurations incorporating more than three wheels may exist or may come to exist. Cart 10 includes a handle 12 with which a user may push or pull the cart 10. Other features of cart 10 are not relevant to the current disclosure other than to note that cart 10 is configured to carry a golf bag, which may or may not include a plurality of golf clubs, and perhaps other golf related equipment. Referring again to handle 12, in various embodiments, handle 12 is configured utilizing tubular, hollow metal, though a composite or other materials may be employed. Handle 12 may also exist in a number of varying configurations, with at least certain of these configurations thought to be ergonomically preferable over another configuration. As described above, certain devices have been developed that may be attached to a golf bag cart handle which allow a user to push and/or pull the golf bag cart without utilization of the hands and arms of the user. The deficiencies in these devices is described above. In addition, it should be noted that many of devices have been developed for use with golf bag carts that incorporate a "straight shaft" type of handle, rather than the more modern handles similar to handle 12 shown in FIG. 1. As such, these devices are not readily capable of use with handle 12 and other modern handle configurations.

Figure 2:
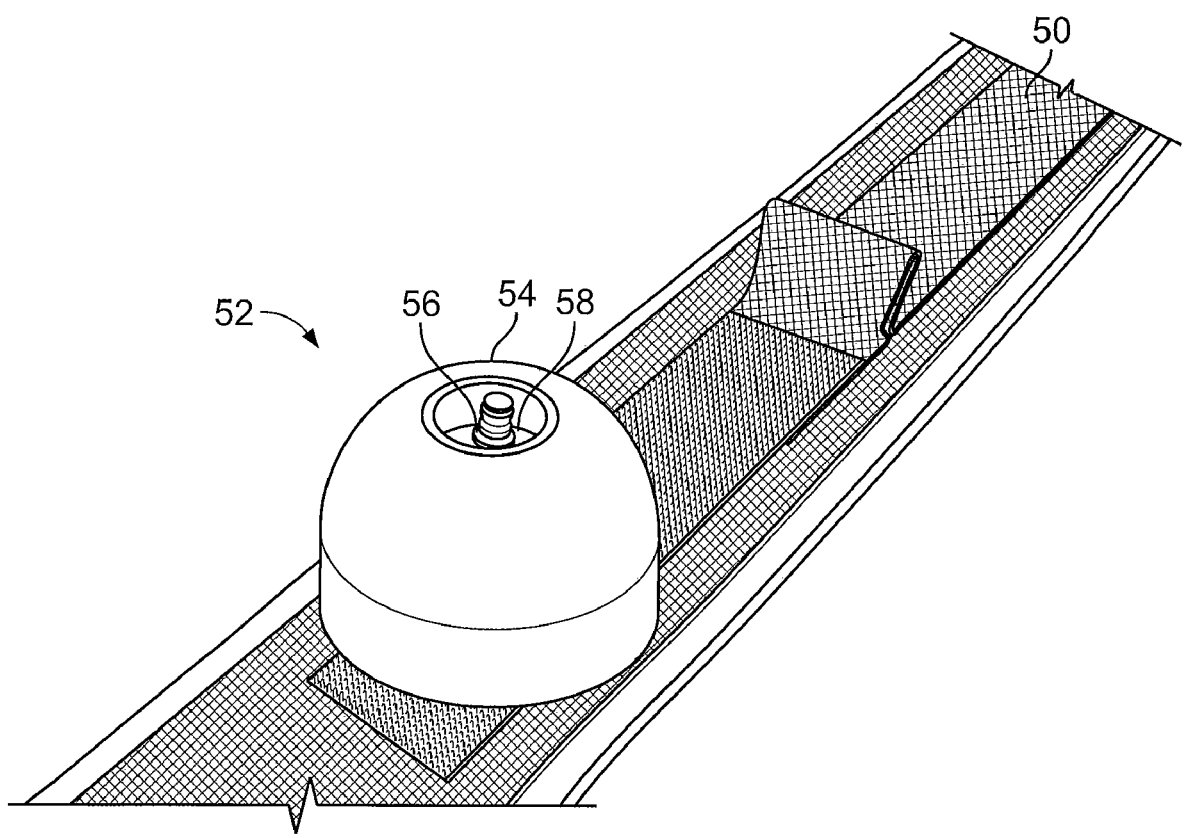
FIG. 2 is a diagram of a belt intended to be worn about the waist of a golfer that includes a golf bag cart interface device.

FIG. 2 is a diagram of a belt 50 intended to be worn about the waist of a golfer. Attached to belt 50, and described in further detail with respect to FIG. 3 below, is a golf bag cart interface device 52 which includes a belt engaging member 54 and a cart handle engaging device 56 extending from a spherical member 58. Spherical member 58 is maintained within belt engaging member 54 as further described below. In certain embodiments, one or both of belt engaging member 54 and spherical member 58 are fabricated from a deformable material. In at least one embodiment, the deformable material is also elastomeric. In other embodiments, one or both of belt engaging member 54 and spherical member 58 are fabricated from a non-deformable material. Belt 50 is similar to a common weight training support belt or a back support belt although with an opening (not shown in FIG. 2), or aperture, formed therein for insertion and engagement of belt engaging member 54. Once belt engaging member 54 is inserted into the opening, it is maintained in position by attaching a retention member (not shown in FIG. 2), such as a piece of material, to belt 50. Belt engaging member 54 may be referred to as a deformable body that extends from belt 50, and in combination with spherical member 58, may also be referred to as one embodiment of a deformable means disposed between golf bag cart handle and belt 50. In certain embodiments, the deformable means is also an elastomeric means.

Figure 3:
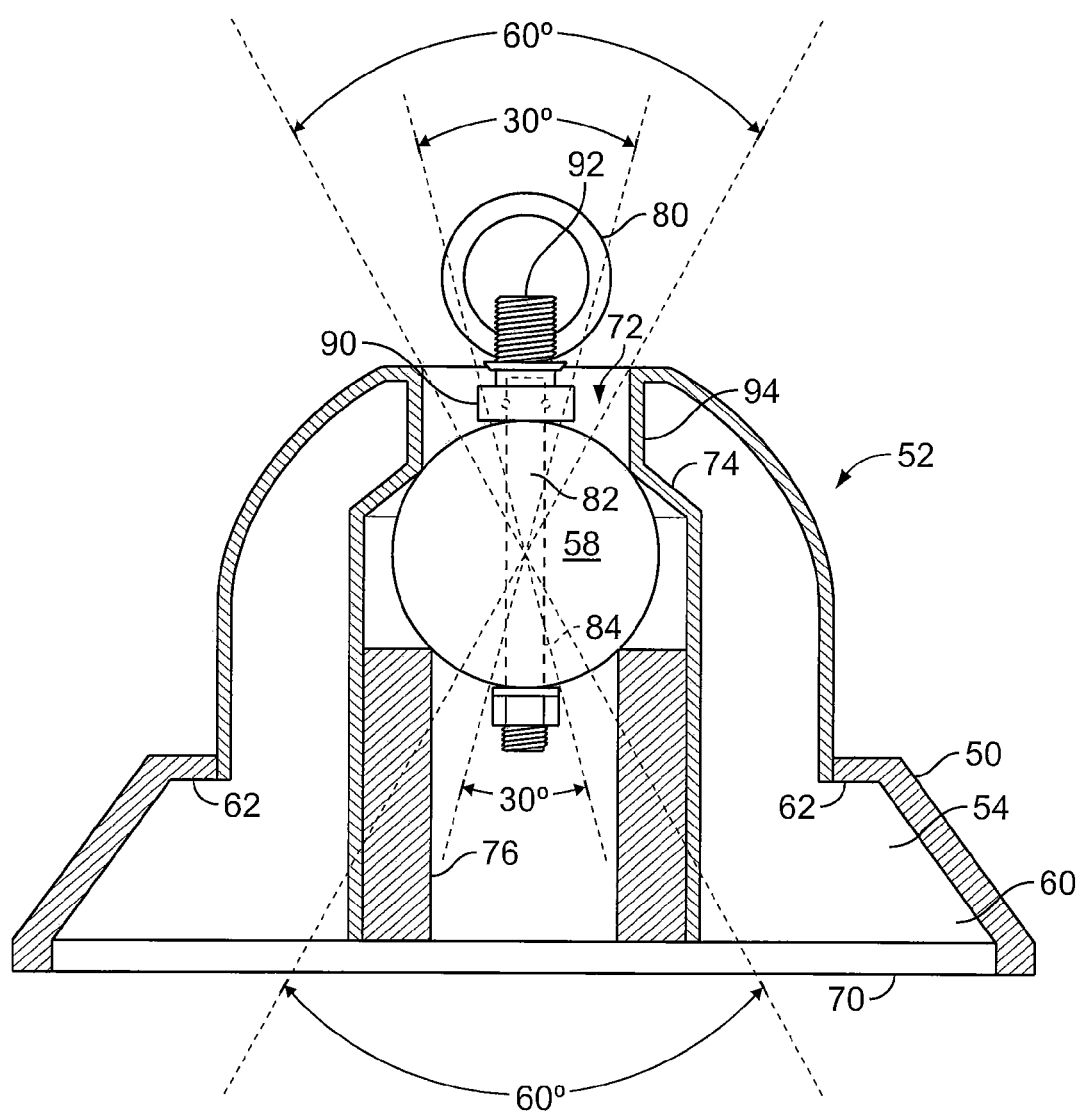
FIG. 3 is a side cutaway view of the golf bag cart interface device illustrated in FIG. 2, illustrating a possible rotation of a spherical member contained therein.

FIG. 3 is a side cutaway view of golf bag cart interface device 52, which better illustrates its individual components. More specifically, belt engaging member 54 includes a flared base 60, or flange, that includes a ridge 62. As belt engaging member 54 is inserted through the opening in belt 50, ridge 62 engages a perimeter that defines the opening in belt 50. A retention member 70, for example a nylon fabric, is attached to belt 50, as shown, which maintains the position of belt engaging member 54 with respect to the belt 50 (and the hole), though belt engaging member 54 is free to rotate with respect to belt 50. Belt engaging member 54 includes a substantially cylindrical bore 72 therethrough for insertion of spherical member 58.

Belt engaging member 54 further includes an inwardly extending protrusion 74, which in a specific embodiment is frusta-conical in shape, allowing belt engaging member 54 to engage spherical member 58. A cylindrical member 76 fits within cylindrical bore 72 also engaging spherical member 58 to maintain a position of spherical member 58 with respect to inwardly extending protrusions 74. Cylindrical member 76 is tubular in shape, resilient, and has a thickness, such that spherical member 58 rests thereon, but is free to swivel within the above described confines of belt engaging member 54. As such cylindrical member 76, in at least one embodiment, provides one embodiment of a resilient cushioning means.

Spherical member 58 is further configured to engage a handle 80 (shown in cross-section) of a golf bag cart. Specifically, a shaft 82 extends through a bore 84 in spherical member 58, and extends therefrom. In use, a connecting member 90 is attached to shaft 82, the connecting member 90 extending from a second shaft 92 which is attached to handle 80. Connecting member 90 may also be referred to herein as a mating coupling device. In one embodiment, handle 80 of the golf bag cart is modified for insertion of second shaft 92. Specifically, second shaft 92, in one embodiment, is a member that includes threads, and handle 80 is modified (e.g., configured with mating threads) such that second shaft 92 can engage handle 80. Spherical member 58, shafts 82 and 92, along with connecting member 90, in combination and in certain embodiments, form a portion of a mounting means or attachment means for attaching belt engaging device 54 to golf bag cart handle 80.

As illustrated, shaft 82 extends all the way through spherical member 58 and into a perimeter defined by cylindrical member 76. The combination of this portion of shaft 82 and cylindrical member 76 serve as a stop for limiting rotation of the spherical member 58 relative to belt engaging member 54. More specifically, a nut 93 or other retention device that maintains shaft 82 within spherical member 58, or the shaft 82 itself, will move against cylindrical member 76 as spherical member 58 is rotated to a maximum angle of rotation providing a stop means. Further, one or both of handle 80 and connecting member 90 will move against a cylinder 94 that is defined between the inwardly extending protrusion 74 and a top surface of belt engaging member 54, also providing a stop means. As handle 80 comes into contact with the belt engaging member 54 of golf bag cart interface device 52, the handle 80 may directly impart the forces that cause deformation of belt engaging member 54 as described herein, rather than the forces being imparted through spherical member 58, shafts 82 and 92, and connecting member 90.

Figure 4:
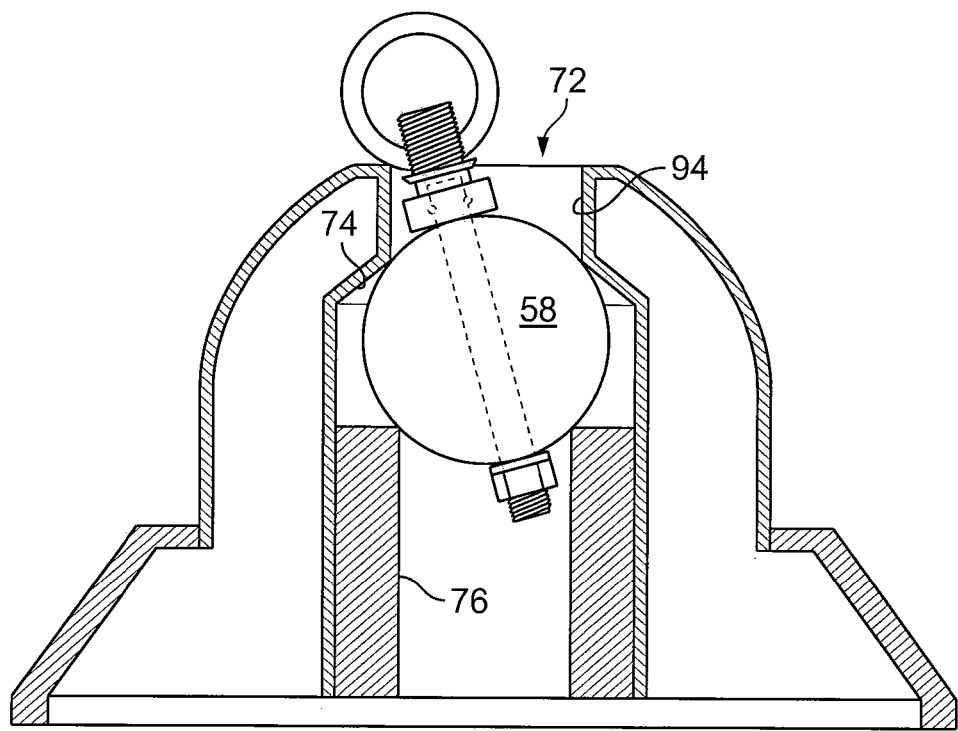
FIG. 4 is an illustration of the golf interface device of FIGS. 2 and 3, with the spherical member rotated to a first maximum rotation position.
Figure 5:
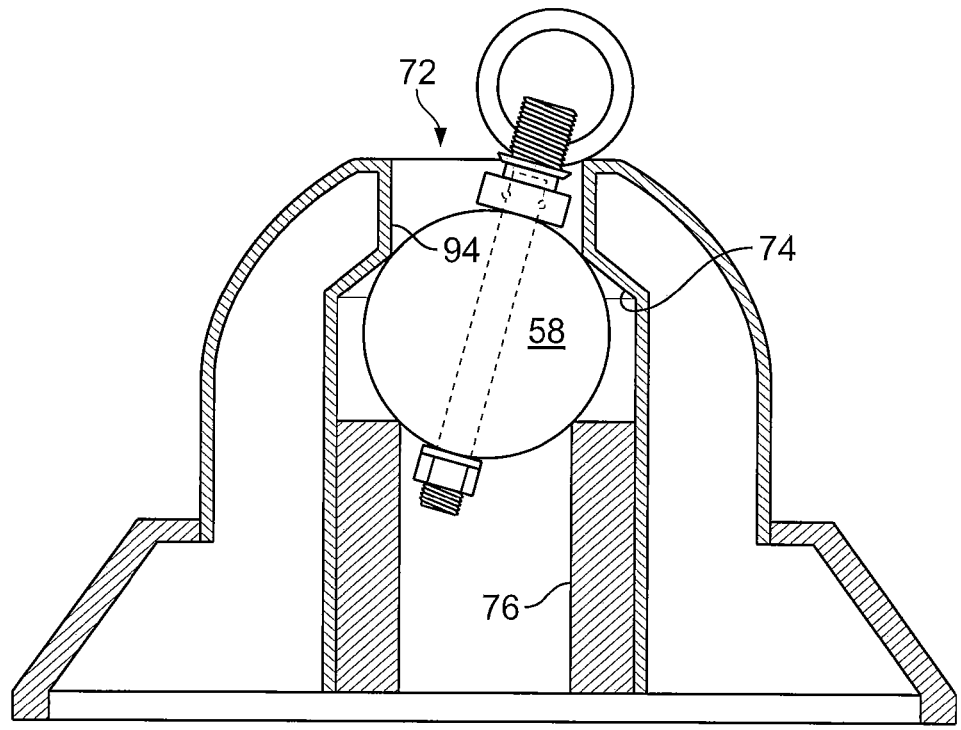
FIG. 5 is an illustration of the golf interface device of FIGS. 2 and 3, with the spherical member rotated to a second maximum rotation position.

FIGS. 4 and 5 illustrate this rotation between spherical member 58 and belt engaging member 54. It should be noted that once spherical member 58 and the components attached thereto are in such position, the deformation properties of belt engaging member 54 allow for some flexure of the entire assembly, providing dampening, to at least somewhat insulate the golfer from the forces applied to the golf interface device 52 by the golf bag cart, as further described below. In certain embodiments, spherical member 58 may also include deformation properties to provide additional dampening. In certain embodiments, spherical member 58 is also elastomeric. In the illustrated embodiments of FIGS. 3-5, there is about 60 degrees of movement possible, with another five to ten degrees provided by elastomeric displacement.

Referring again to FIG. 3, the easily attachable and detachable coupling between connecting member 90 and shaft 82, allows a user to quickly attach and detach handle 80 from belt 50. The configuration of belt engaging member 54 allows for a degree of movement of handle 80 with respect to belt engaging member 54, which at least partially provides for shock adsorption and control of the golf bag cart when being pulled by a user.

Figure 6:
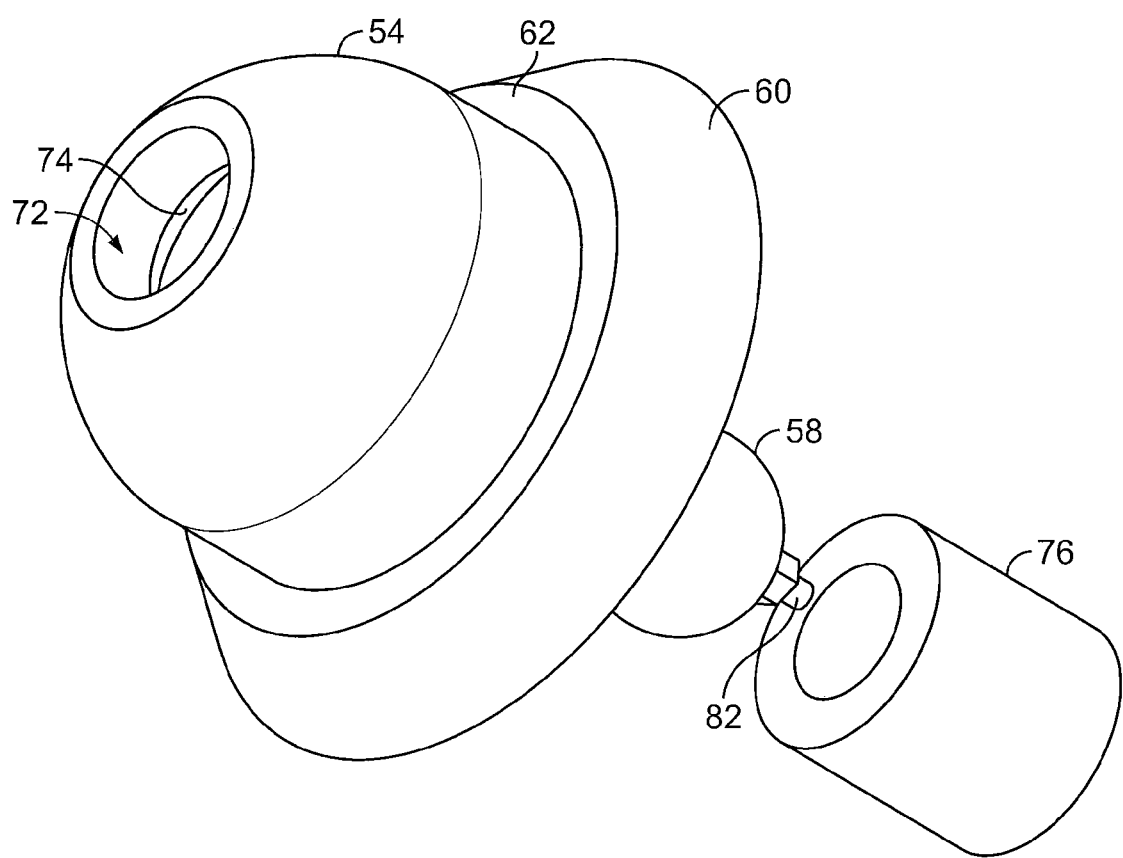
FIG. 6 is an exploded view illustrating several of the components of golf bag cart interface device of FIGS. 3-5.

FIG. 6 is an exploded view illustrating several of the components of golf bag cart interface device 52, and is provided to further illustrate the structure described with respect to FIG. 3. In one specific embodiment, spherical member 58 is rigidly attached to a handle of a golf bag cart, and a range of motion is provided by a rotational interaction between belt engaging member 54 and spherical member 58, based on movements of the user wearing belt 50 and the motion of the golf bag cart. As described above, there is a limit to the relatively free rotational movement between spherical member 58 and belt engaging member 54, which controls a range of movement of handle 80 with respect to belt 50. More specifically, the degree of rotational movement of between spherical member 58 and belt engaging member 54 is further defined by one or more of the diameter of spherical member 58, the diameter of a bore through cylindrical member 76, and a diameter of substantially cylindrical bore 72.

Figure 7:
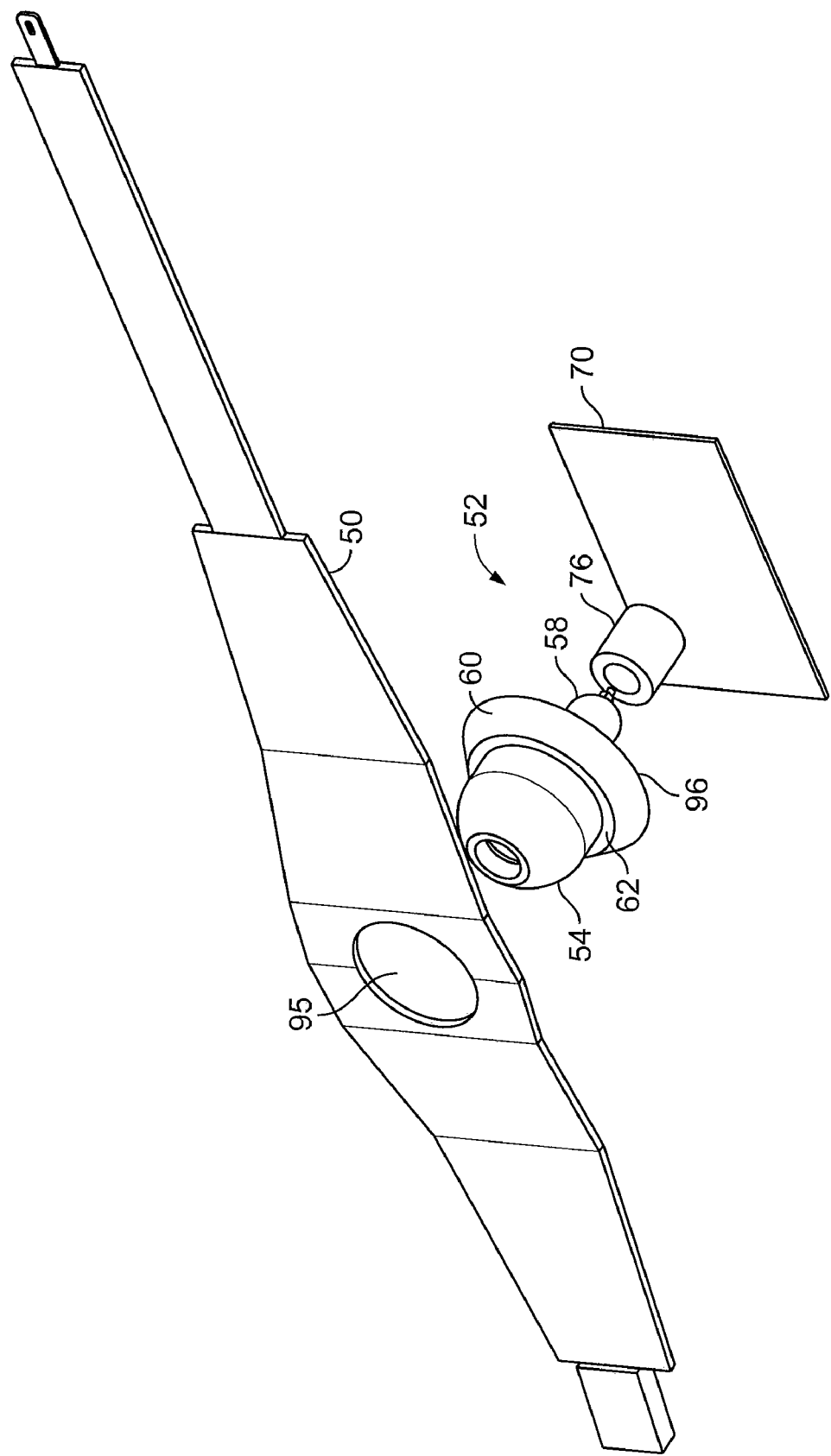
FIG. 7 is an exploded view of the golf bag cart interface device of FIGS. 2 and 3, with respect to the belt and a retention device.

FIG. 7 is an exploded view illustrating the components of golf bag cart interface device 52, as described above, with respect to belt 50 and retention device 70. FIG. 7 illustrates opening 95 formed in belt 50, which has been described above. From the illustration of FIG. 7, it easily seen how the flared base 60 and ridge 62 of belt engaging member 54 engage the perimeter formed by the fabrication of opening 95. As described above, as belt engaging member 54 is inserted through opening 95, ridge 62 engages the perimeter surrounding opening 95. Retention member 70 is then attached to belt 50, against a bottom 96 of flared base 60, to maintain the position of belt engaging member 54 and cylindrical member 76 with respect to the belt 50, as retention member also contacts and holds in place cylindrical member 76. Also shown in FIGS. 6 and 7 is that the circumference of spherical member 58 is larger that the perimeter defined within cylindrical member 76, such that spherical member 58 will rest upon cylindrical member 76 when the assembly of golf bag cart interface device 52 is complete.

Figure 8:
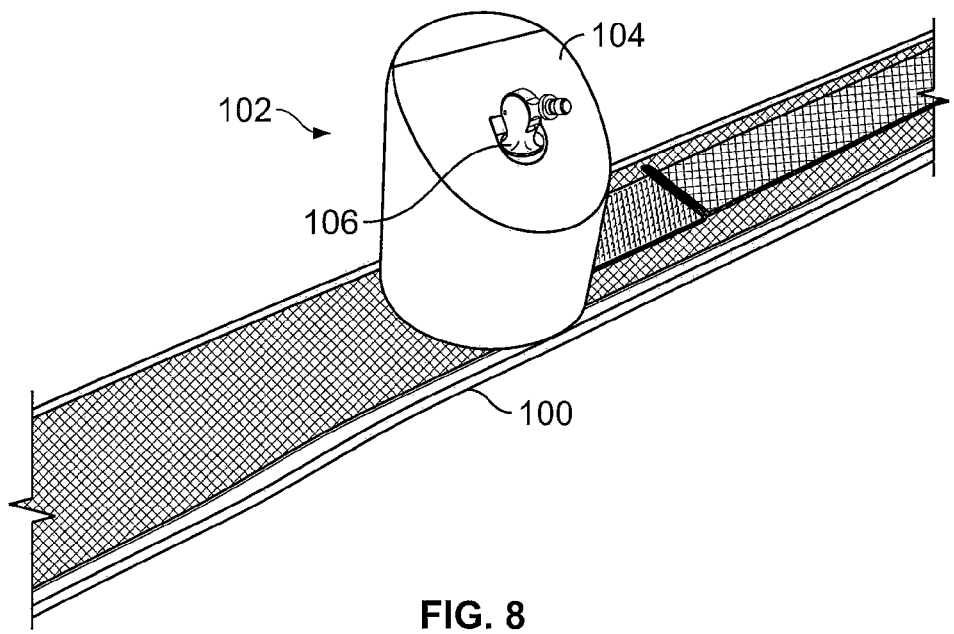
FIG. 8 is a diagram of a belt intended to be worn about the waist of a golfer that includes an alternative embodiment of a golf bag cart interface device.

FIG. 8 is a diagram of an alternative embodiment for a belt 100 intended to be worn about the waist of a golfer. Belt 100 is similar to belt 50 described with respect to FIGS. 2 and 3. Attached to belt 100, and described in further detail with respect to FIG. 9 below, is a golf bag cart interface device 102 which includes a belt engaging member 104 from which a pivoting connection device 106 extends. Belt engaging member 104 is attached to belt 100 in the same manner as belt engaging member 54 is attached to belt 50, though belt engaging member 104 is free to rotate with respect to belt 100.

In an embodiment, and as further described below, a portion of the structure of pivoting connection device 106 is embedded within belt engaging member 104 in a molding process as belt engaging member 104 is fabricated from a deformable material which in certain embodiments is also an elastomeric material.

Figure 9:
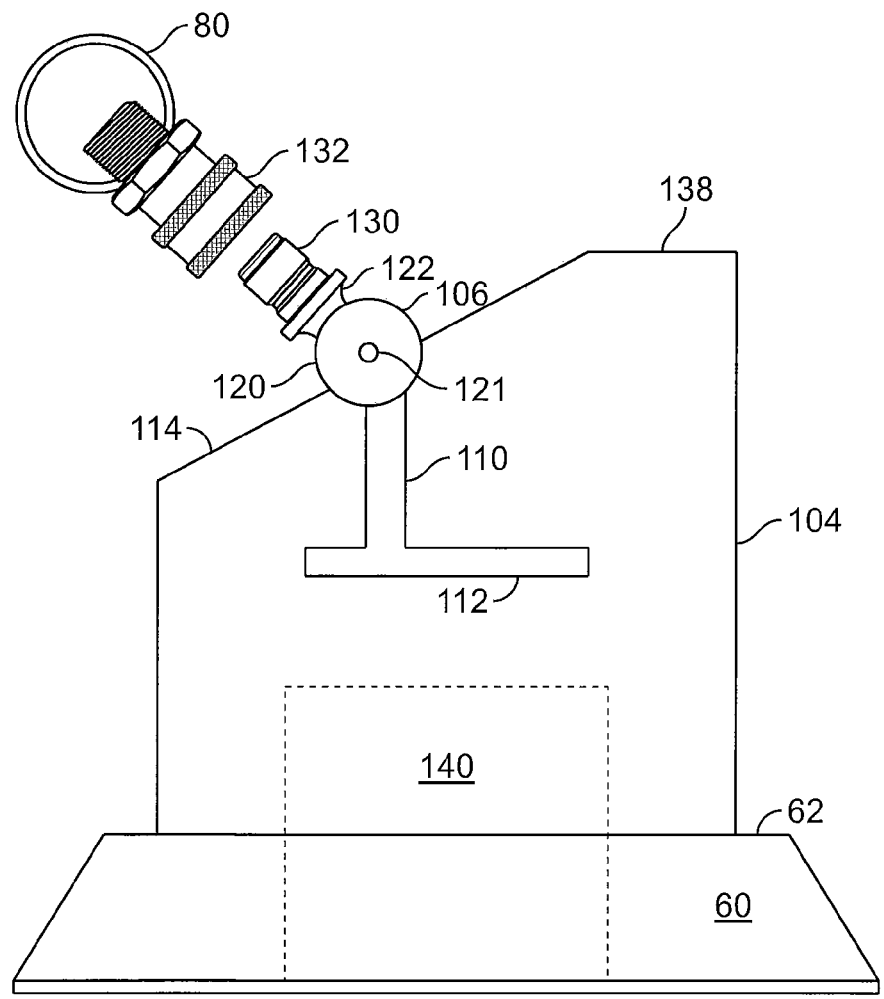
FIG. 9 is a side cutaway view of the golf bag cart interface device illustrated in FIG. 8.

FIG. 9 is a cross-sectional view of belt engaging member 104 which includes a flared base 60 and ridge 62 like that of belt engaging member 54. As mentioned above, belt engaging member 104 includes pivoting connection device 106 which is embedded within. One embodiment of pivoting connection device 106 includes structural members 110 and 112, sometimes referred to collectively herein as a single member, which in the illustrated embodiment are substantially perpendicular to each other. Structural members 110 and 112 are embedded within belt engaging member 104 with a portion 120 of structural member 110 extending through an upper surface 114 of belt engaging member 104. This portion 120 of structural member 110 is configured such that a pivoting member 122 may be attached thereto using a pivoting connection member 121, which is sometimes referred to as a pivot means.

Member 122 includes a male connecting member 130 extending therefrom. Male connecting member 130 is configured for temporary attachment to a female connecting member 132 that is attached to handle 80 via shaft 134. Members 130 and 132 together form a coupling device which enables an attachment between belt engaging member 104 and golf bag cart handle 80. Members 130 and 132 may also be referred to herein in combination as a mating coupling device. In an embodiment, handle 80 of the golf bag cart is modified for insertion of shaft 134. In a specific embodiment, female connecting member 132 includes threads, and handle 80 is modified (e.g., configured with mating threads) such that both can be engaged by shaft 134 allowing female connecting member 132 to be attached to handle 80.

The ease with which connecting members 130 and 132 may couple to, and de-couple from, one another allows a user to quickly attach and detach handle 80 from belt 100 (and belt engaging member 104). The configuration of belt engaging member 104 with respect to pivoting member 122 allows for a degree of movement of handle 80 with respect to belt engaging member 104, which at least partially provides for shock adsorption and control of the golf bag cart when being pulled by a user. Pivoting connection device 106, shaft 134 and members 122, 130, and 132, in combination and in certain embodiments, form a portion of a mounting means or attachment means for attaching belt engaging device 104 to golf bag cart handle 80. It should be noted that in use, handle 80 and members 122, 130, and 132 may rotate about pivoting connection member 121 such that handle 80 comes into contact with top surface 138 of belt engaging member 104. In such a position, handle 80 may directly impart the forces that cause deformation of belt engaging member 104 as described herein, rather than the forces being imparted through members 106, 122, 130, and 132.

Additionally, belt engaging member 104 may include a hollow core 140, as shown in FIG. 9. Parameters of hollow core 140 may be modified, in various embodiments, to at least partially define deformation properties of the material from which belt engaging member 104 is fabricated. For example, when hollow core 140 is fabricated to have a larger area, and with a constant outside dimension for belt engaging member 104, less deformable material remains to resist the load of cart 10. In such embodiments, more deformation of belt engaging member 104 occurs, and less control is exerted on the load of cart 10. A larger range of movement of the belt engaging member 104, and therefore cart 10, also results. Conversely, when hollow core 140 is fabricated to have a smaller area, and with a constant outside dimension for belt engaging member 104, more deformable material remains to resist the load of cart 10. In such embodiments, less deformation of belt engaging member 104 occurs, and more control is exerted on the load of cart 10. A smaller range of movement of the belt engaging member 104, and therefore cart 10, also results.

Embodiments of belt engaging member 104 may be described as a deformable means disposed between handle 80 and belt 100, which in certain embodiments is also an elastomeric means. It should be noted for any and all embodiments of belt engaging members described herein, a hollow core may be utilized to control deformation properties and dampening of forces applied to a user as they utilize the belts with a golf bag cart.

Figure 10:
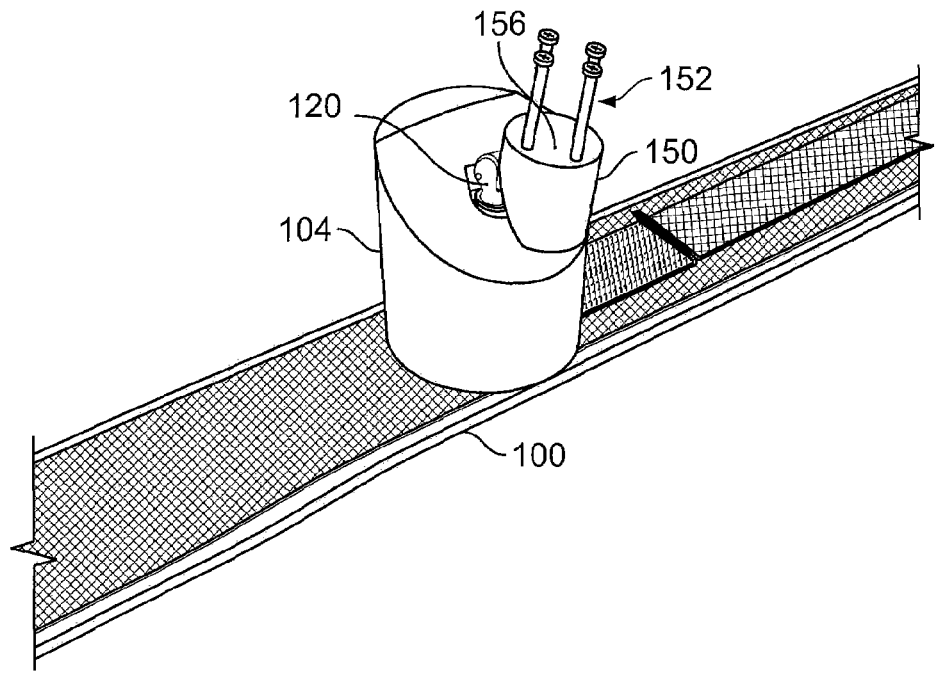
FIG. 10 is an illustration of a belt and a belt engaging member having a golf bag cart handle clamping device attached thereto.

Some golf bag cart handles may not be modifiable for insertion of connecting members like second connecting members 92 and 132. Further, some users may not have the desire, or the equipment, necessary for forming a hole or opening, threaded or unthreaded, in the handle of their golf bag cart. FIG. 10 is an illustration of belt 100, belt engaging member 104, and pivoting member 120. Attached to pivoting member 120 is a handle attachment device 150 that is utilized in a clamping arrangement with a golf bag cart handle such as handle 80 (shown in FIGS. 3 and 9). In one embodiment, male and female connecting members 130 and 132 are utilized to attach handle attachment device 150 to belt engaging member 104.

Figure 10A:
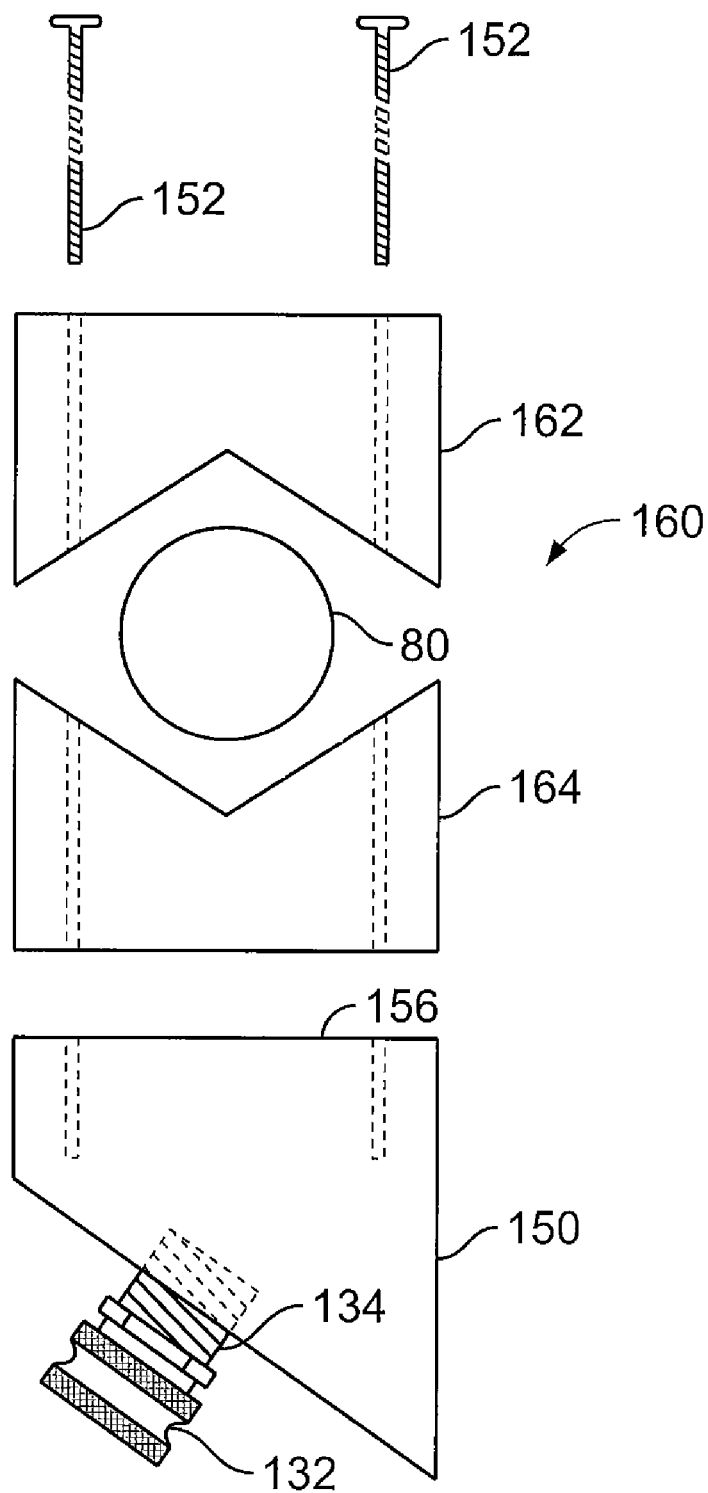
FIG. 10A is a further illustration of the golf bag cart handle clamping device of FIG. 10.

Attachment devices 152, illustrated in FIG. 10 as being four screws or bolts, are of a length sufficient to extend through a number of clamping devices. The described arrangement is further illustrated in an exploded view in FIG. 10A. As illustrated, and in one embodiment, a clamping device 160 includes two halves 162, 164 that are shaped to substantially wrap around and snugly engage handle 80 when properly engaged with one another. Clamping device 160 has a opening pattern therethrough similar to handle attachment device 150, such that attachment devices 152 cause the two halves to engage handle 80 when the attachment devices 152 engage handle attachment device 150. In the embodiment, one of the halves has a surface configured to be adjacent a surface 156 of handle attachment device 150 as the attachment devices 152 are tightened. Handle attachment device 150 and attachment devices 152, in combination and in certain embodiments, form a portion of a mounting means for attaching a belt engaging device to a golf bag cart handle.

While the handle attachment device 150 is described and illustrated as being attached to belt engaging member 104 through pivoting member 120, it may also be utilized with the belt engaging member 54, cart handle engaging device 56, and spherical member 58 described with respect to FIGS. 2-7 or the embodiment described with respect to FIG. 11 below.

Figure 11:
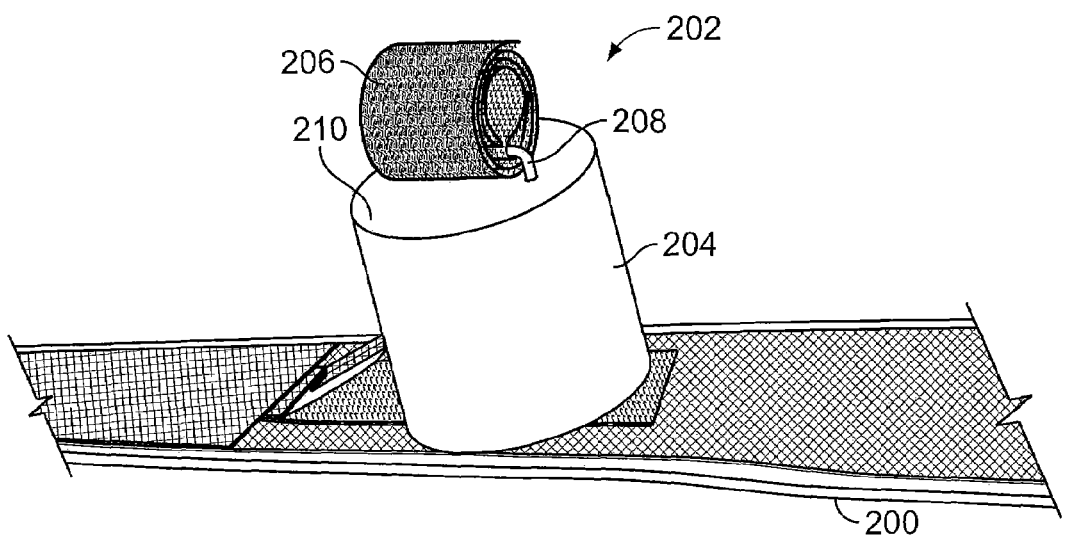
FIG. 11 is a diagram of a belt intended to be worn about the waist of a golfer that includes another alternative embodiment of a golf bag cart interface device.

FIG. 11 is a diagram of another alternative embodiment for a belt 200 intended to be worn about the waist of a golfer. Belt 200 is similar to belts 50 and 100 described above. Attached to, and extending from, belt 200 is a golf bag cart interface device 202 which includes a belt engaging member 204, which in one embodiment is a deformable means disposed between a golf bag cart handle and belt 200. As in the embodiments described above, belt engaging member 204, though maintained in an engaging position with respect to belt 200, may also rotate with respect to belt 200. Partially embedded within belt engaging member 204 is a structure. The portion of the structure that is not embedded within belt engaging member 204 is utilized for attachment of a strap 206 and is referred to herein as a loop 208. A torque applied to loop 208, via strap 206 may cause belt engaging member 204 to rotate with respect to belt 200. In this embodiment, strap 206 is utilized to snugly attach a golf bag cart handle to belt engaging member 204 through loop 208. In various embodiments, strap 206 is permanently attached to loop 208 or attached with hook and loop fasteners, though strap 206 is free to rotate about loop 208. However, in any of the embodiments, the herein described benefits of the deformation properties, and in certain embodiments elastomeric properties, of belt engaging member 204 are realized. Strap 206 and loop 208 may be referred to in combination as a mounting means. Belt engaging member may also be fabricated with a hollow core as described above, to control its deformation properties.

The above described configuration of belt engaging member 204 with respect to belt 200, combined with that of strap 206 and loop 208, may allow a golf bag cart handle to come into contact with a top surface 210 of belt engaging member 204. Specifically, belt engaging member 204 may rotate with respect to the golf cart bag handle until it contacts top surface 210. As in embodiments described above, the golf cart bag handle may directly impart the forces that cause deformation of belt engaging member 204 as described herein, rather than the forces being imparted to belt engaging member 204 through strap 206 and loop 208.

Figure 12:
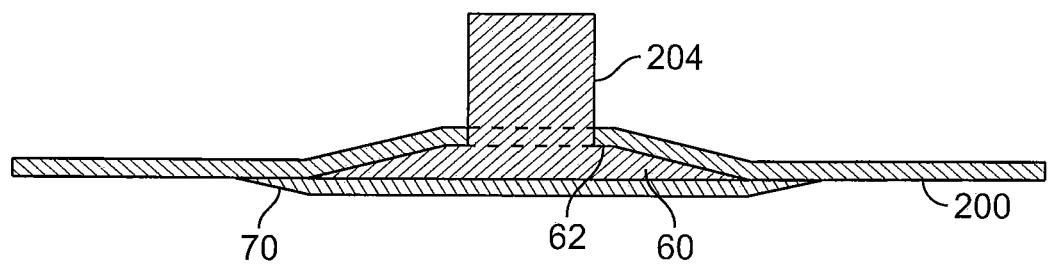
FIG. 12 is a side view illustrating a belt engaging member secured between a belt and a retention member.

FIG. 12 is a side view illustrating belt engaging member 204 secured between belt 200 and a retention member 70. Though FIG. 12 utilizes belt engaging member 204 and belt 200 for illustration, it is to be understood that all of the herein described belt engaging members are secured to their respective belts as shown in FIG. 12. Specifically, and as previously described, belt engaging member 204 is inserted through a opening in belt 200 until a ridge 62 formed as a part of belt engaging member 204 engages the perimeter formed by the fabrication of the opening in the belt 200. Extending at a slope from ridge 62, belt engaging member 204 includes a flared base 60, which may be referred to as a flange, which helps to ensure that belt engaging member 204 will not slip through the opening in belt 200. Retention material 70 has a surface area larger than that of flared base 60 and is attached to belt, covering flared base 60, to retain the belt engaging member 204 within belt 200.

Figure 13:
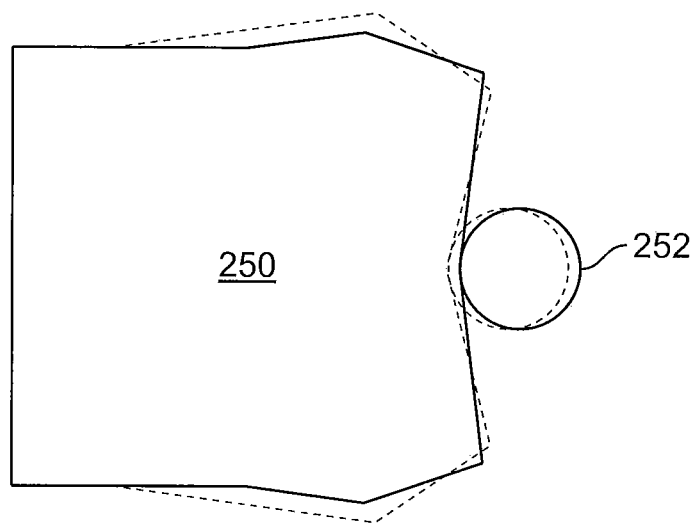
FIG. 13 is an illustration of a belt engaging member in two stages of deformation, based on different amounts of force being exerted on it by a golf bag cart handle.

FIG. 13 is an illustration of a belt engaging member 250 that is representative of any one of belt engaging members 54, 104, and 204 described above, and in various embodiments may be referred to as one or more of a deformable body, deformable means, a controlling means, and an elastomeric means, that is attached to and extends from the belt described herein. Embodiments of belt engaging member 250 other than belt engaging members 54, 104, and 204 are contemplated, which include the deformable and elastomeric properties described above. Belt engaging member 250 is substantially cylindrical when not subjected to any forces, though in other embodiments, it may be shaped differently. However, in FIG. 13, belt engaging member 250 is illustrated in two stages of deformation, as a result of two different amounts of force being exerted to it by a golf bag cart handle 252. Belt engaging member 250 is not compressed, rather its shape is deformed. As belt engaging member 250 is fabricated from a resilient material, it will regain its original shape once the forces have been removed. The dashed outline represents a greater amount of force being applied to belt engaging member 250 than the solid line depiction. The deformation depicted in FIG. 13 is representative of the forces applied by cart handle 252, for example, during a downhill travel of the cart, the user walking backwards, and during a braking of the cart. As illustrated, belt engaging member 250 has a controlled range of motion. While depicted and described as cylindrical, it is noted that other shapes for the belt engaging members described herein are contemplated, including, but not limited to, any polygon shape and oblong shapes. Because of the deformation properties described herein, belt engaging members may also referred to as deformable members or elastomeric members.

Figure 14:
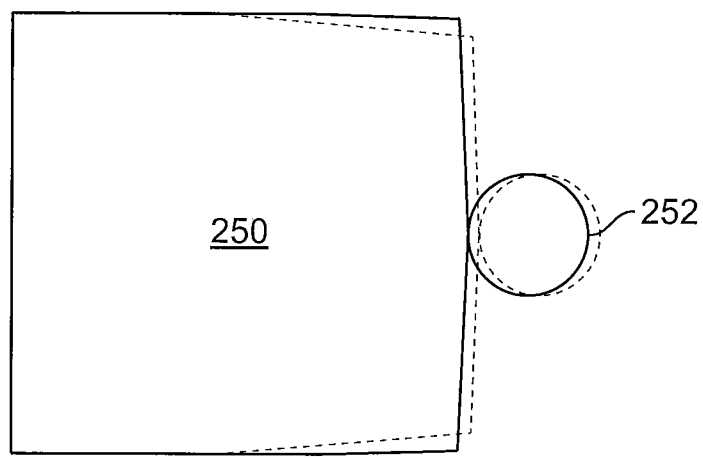
FIG. 14 is an illustration of a belt engaging member in two stages of deformation, based on different amounts of force being exerted on it by a golf bag cart handle, the forces being in the opposite direction of those illustrated in FIG. 13.

The deformation depicted in FIG. 14 is representative of the forces applied to belt engaging member 250 by cart handle 252, for example, during an uphill travel of the cart, the user walking forwards, and during a forward acceleration of the cart. As illustrated, belt engaging member 250 provides a controlled range of motion, for example, when the load of the cart and golf bag can no longer deform belt engaging member 250. To partially illustrate, the dashed outline represents a greater amount of force being applied to belt engaging member 250 by cart handle 252 than the solid line depiction.

Figure 15:
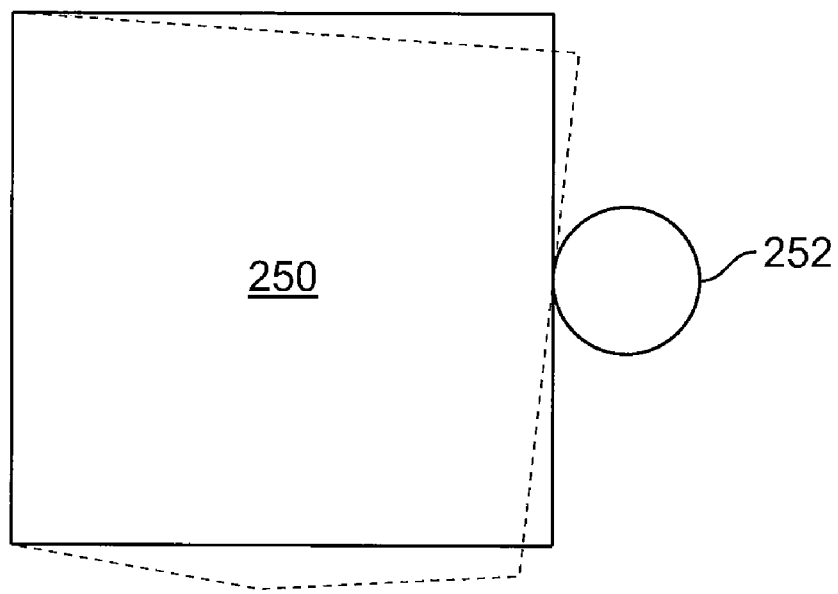
FIG. 15 illustrates a deformation of belt engaging member when the user is pulling the cart downhill.

The dashed line in FIG. 15 illustrates a lateral deformation of belt engaging member 250, for example, when the user is pulling the cart and walking down a slight grade. A similar deformation of belt engaging member 250 will occur, in a different plane, when the user executes a turn to his right.

Figure 16:
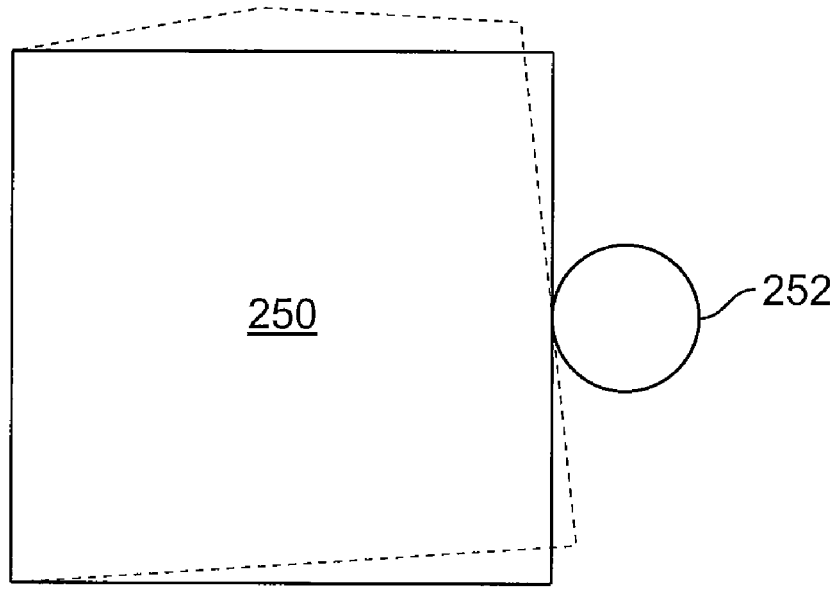
FIG. 16 illustrates a deformation of belt engaging member when the user is pulling the cart uphill.

Similarly, FIG. 16 illustrates another lateral deformation of belt engaging member 250, for example, when the user is pulling the cart walking up a slight grade. A similar deformation of belt engaging member 250 will occur, in a different plane, when the user executes a turn to his left.

Figure 17:
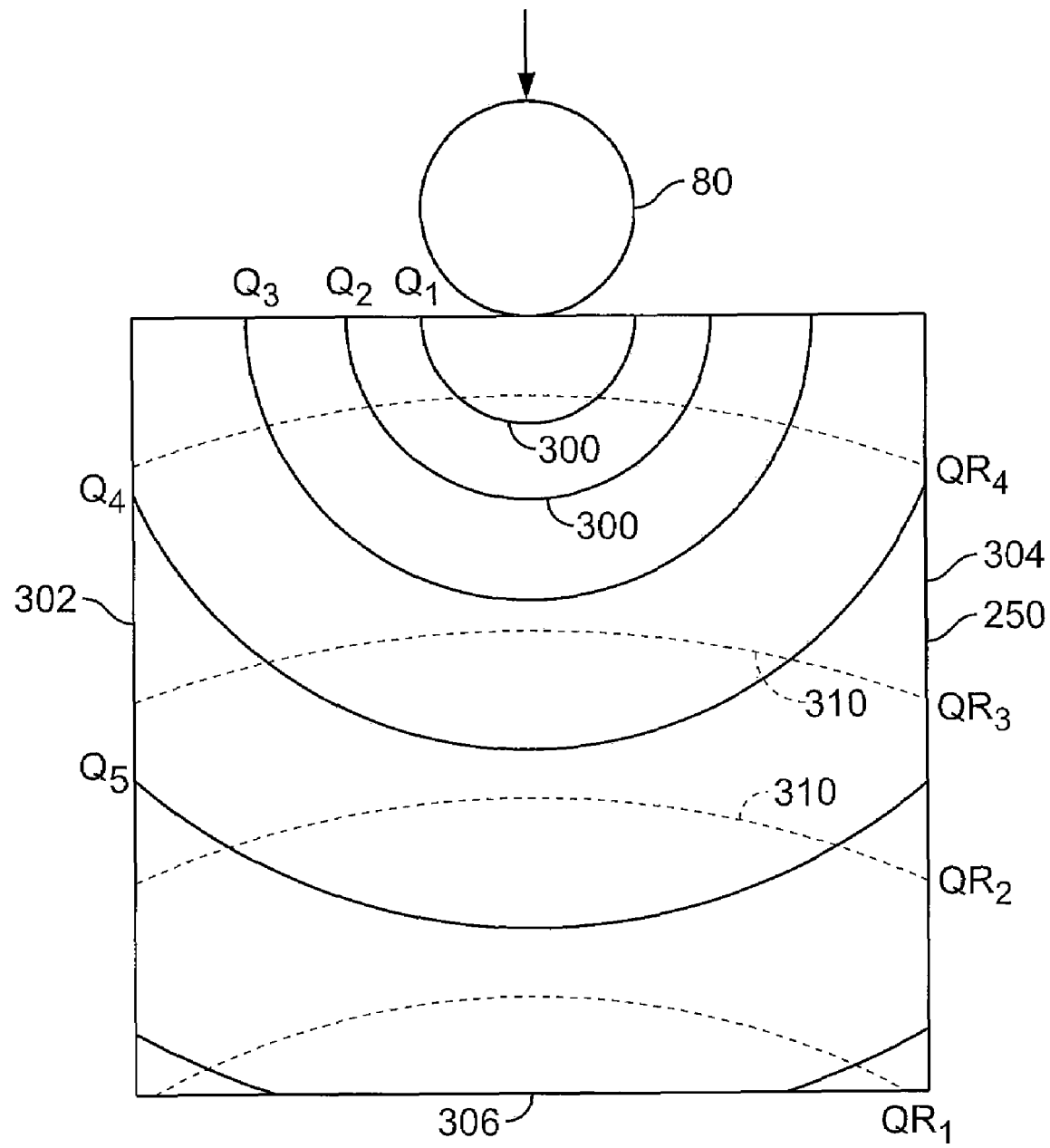
FIG. 17 is a diagram illustrating how the forces applied to a belt engaging member by a golf bag cart handle are dissipated therein.

FIG. 17 is a diagram illustrating how the forces applied to belt engaging member 250 by a golf bag cart handle 80 are dissipated therein. Resilience, or elasticity, of belt engaging member 250 is based on the characteristics of the elastomer from which belt engaging member 250 is fabricated, including any hollow core or other modification to the embodiments for belt engaging members described herein. The resilience is measured as a percentage of the energy given back on a recovery from deformation caused by the handle 80 pushing against belt engaging member 250. Some of this energy is dissipated in the process of deforming the belt engaging member 250. Resilience is also a measure of the vibration dampening properties of the elastomer. As illustrated in the Figure, as the force 300 applied by handle 80 traverses across belt engaging member 250, it tends to extend across an entire width, to the sides 302, 304 of belt engaging member 250, reducing in strength. As the forces reflect from a far end 306 of belt engaging member 250, they are further reduced in strength as illustrated by the dashed lines of force 310.

All of FIGS. 13-17 serve to further illustrate that the resilience of belt engaging member 250 is related to the dampening properties of the elastomeric material from which belt engaging member 250 is fabricated. In the described embodiments, the elastomeric material serves to dampen forces transmitted between a golf bag cart and a user and further serves to control movement of the golf bag cart while the cart is being towed by a user wearing one of the above described belt embodiments when the belt is attached to the golf bag cart. More specifically, all of the belt engaging members described herein provide a resistance to further movement of a golf bag cart in a direction of travel of the cart, and in a direction of travel that is transverse to the direction of travel of the cart. To accomplish this resistance, the belt engaging members absorb some of the energy of the golf bag cart, for example that of a cart tending to accelerate down a hill, by decompressing. Through this decompression, the pressure felt by the golfer using such an apparatus is reduced as compared to known golf bag cart towing apparatus.

Figure 18:
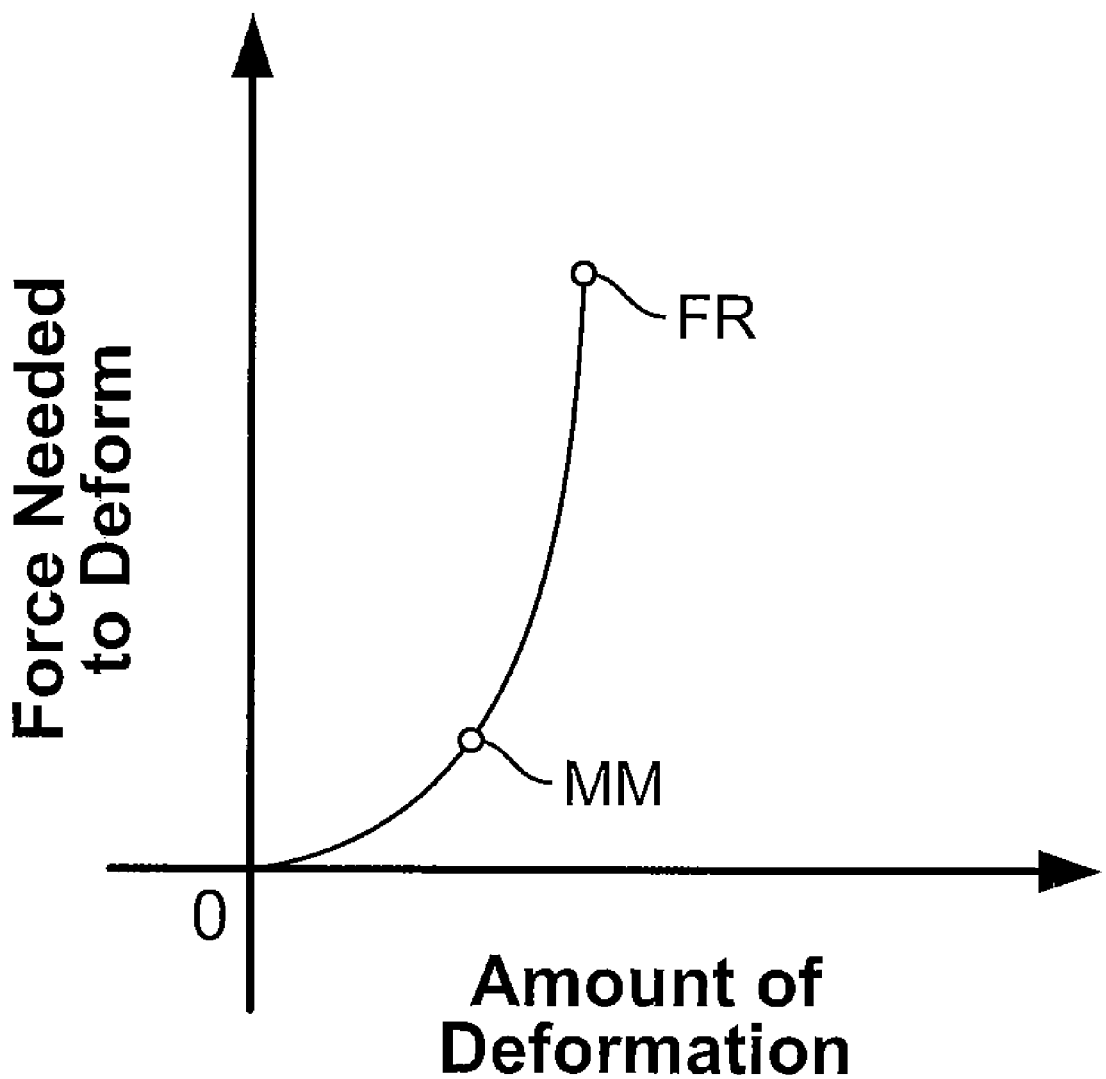
FIG. 18 is a graphical illustration of dynamic modulus of belt engaging members.

In the above described embodiments, a dynamic modulus of the belt engaging members, which is the stiffness or resistance to further deformation of belt engaging members and other components described herein provides, at least in part, the dampening and control of movement properties herein described. These properties are illustrated in graphical form in FIG. 18 where an amount of force needed to provide further deformation increases exponentially as the maximum modulus of a load (point MM) is surpassed. Point FR is the point where a deformable body has no further capability to deform.

In the described embodiments, the deformable bodies limit the range of motion of the golf bag cart when the maximum modulus has been attained. The deformable body has the capability to elongate past a maximum load point (MM) of the cart, clubs, bag, and the torque they cause. This capability, and the exponential increase in the force needed to surpass point MM, provides at least a portion of a shock adsorbing capability provided by the herein described embodiments, by progressively stiffening as forces applied thereto increase. As such, the deformable bodies herein described deforms easily for minor ground deformations, but further has a capability to stiffen when incurring larger loads and/or ground or speed variations.

The above described spherical member, pivoting, and strap embodiments provide enough flexibility in the attachment between golf bag cart and a user that, for a golf bag cart with more than two wheels, all of the wheels maintain an engagement with the terrain. With more than two wheels making terrain contact, more of the weight of the golf bag and cart is distributed to the terrain. This distribution lessens any forces that would be applied to a user when only two wheels of a golf bag cart make ground contact. Alternatively, the user may adjust the fit and angles associated with the device so that only two wheels of the cart engage the terrain, as this configuration may provide ease of operation (is smoother) on uneven terrain.

Figure 19:
FIG. 19 is an illustration of one embodiment of a user wearing a belt attached to a golf bag cart.

While described herein as being capable of use with a golf bag cart, as illustrated in FIG. 19 and including an umbrella attached thereto, the apparatus and various embodiments are not so limited. It is contemplated that certain embodiments are capable of utilization with athletic training equipment, where the belt may be easily coupled and decoupled from weight machines and the like. Other embodiments are capable of utilization with conventional child strollers, and strollers that are configured for utilization during certain athletic activities leaving the users hands, at least temporarily free to engage in other activities. The belt may also find use with lawnmowers. The device embodiments described herein might also be utilized with little to no modification to provide an interface to a rickshaw, wagon, or other similar devices.

While the invention has been described in terms of various specific embodiments, those skilled in the art will recognize that the invention can be practiced with modification within the spirit and scope of the claims.

What is claimed is:

1. Apparatus for towing a multiple-wheeled golf bag cart over a terrain, said apparatus configured for attachment to a handle of the golf bag cart and further configured for attachment to the waist of a golfer, said apparatus comprising:

a belt member configured for attachment to said waist of said golfer;

deformable means configured to be disposed between said cart handle and said belt member for controlling movement of said cart while said cart is being towed, said deformable means deformable in multiple axes, wherein said deformable means comprises elasteromeric means to control movement in the multiple axes; and mounting means configured to be attached to said handle for attaching said elastomeric means to said handle; wherein said mounting means is configured to hold said elastomeric means in an at rest position in which said elastomeric means is spaced from said handle, said mounting means operable to hold said elastomeric means in an actuated position in contact with said handle wherein said elastomeric means is deformable to dampen forces transmitted between said cart and said golfer.

2. The apparatus of claim 1 wherein said elastomeric means is configured to dampen forces transmitted between said cart and said golfer.

3. The apparatus of claim 1 wherein said elastomeric means is deformable to apply a force to said cart to resist a movement of said cart, said force increasing in magnitude as deformation of said elastomeric means increases in magnitude.

4. The apparatus of claim 3 wherein said elastomeric means is configured to resist a further movement of said cart in a direction of travel of said cart.

5. The apparatus of claim 4 wherein said elastomeric means is configured to resist movement of said cart in a direction transverse to the direction of travel of said cart.

6. The apparatus of claim 1 wherein said mounting means is configured to hold said elastomeric means in an at rest position in which said elastomeric means does not interfere with said golfer's grip of the cart handle, said mounting means operable to hold said elastomeric means in an actuated position in contact with said handle wherein said elastomeric means is deformable to dampen forces transmitted between said cart and said golfer.

7. The apparatus in claim 1 in which the mounting means is affixed at a first end to said cart and at a second end to said elastomeric means.

8. The apparatus of claim 7 in which said mounting means comprises:
   a first member affixed to said cart handle;
   a second member affixed to said elastomeric means;
   pivot means disposed between said first and second members and about which said second member may rotate relative to said first member to move said elastomeric means in to contact with said handle wherein said elastomeric means is deformable to dampen forces transmitted between said cart and said golfer.

9. The apparatus of claim 1 wherein said belt member includes an aperture for receiving said elasotomeric means.

10. The apparatus of claim 9 wherein said elastomeric means includes a first end engaged by said mounting means and a second end received by said aperture.

11. The apparatus of claim 10 wherein said second end includes a flange portion engaged by said belt and trapped between said belt and said waist of said golfer.

12. The apparatus of claim 1 wherein said deformable means dampens forces transmitted between said cart and said golfer.

13. The apparatus of claim 12 wherein said deformable means is deformable to apply a force to said cart resisting movement of said cart, said force increasing in magnitude as deformation of said deformable increases in magnitude.

14. Apparatus for towing a multiple-wheeled golf bag cart over a terrain, said apparatus configured for attachment to a handle of the golf bag cart and further configured for attachment to the waist of a golfer, said apparatus comprising:
   a belt member configured for attachment to said waist of said golfer;
   deformable means configured to be disposed between said cart handle and said belt member for controlling movement of said cart while said cart is being towed; and
   mounting means configured to be attached to said handle for attaching said deformable means to said handle, said mounting means comprising a first member affixed to said cart handle and a substantially spherical member supported by said first member, said deformable means surrounding and supported by said spherical member, said deformable means rotatable about and relative to said spherical member and into contact with said cart handle wherein said deformable means is deformable to dampen forces transmitted between said cart and said golfer.

15. The apparatus of claim 14 wherein said spherical member has a spherical surface disposed about a center, said deformable means rotatable about said center in all directions.

16. The apparatus of claim 15 further comprising:
   a cavity in said deformable means, said spherical member residing in said cavity, said deformable means engaging said spherical surface at a first end of said spherical member; and
   resilient cushioning means residing in said cavity and in engagement with said deformable means for cushioning forces transmitted between said cart and said golfer, said cushioning means engaging said spherical surface at a second end of said spherical member, said deformable means and said cushioning means effective to capture said spherical member therebetween.

17. The apparatus of claim 16 further comprising stop means disposed at said second end of said spherical member for engaging said cushioning means to limit rotation of said deformable means relative to said spherical member.

18. The apparatus of claim 17 wherein said deformable means and said cushioning means are rotatable about said spherical member, said stop means stopping said rotation when said stop means abuts said cushioning means.

19. The apparatus of claim 14 further comprising stop means for limiting rotation of said deformable means relative to said spherical member after said deformable means has rotated into contact with said cart handle.

20. The apparatus of claim 14 wherein said deformable means is deformable to apply a force to said cart resisting movement of said cart, said force increasing in magnitude as deformation of said elastomeric means increases.

21. The apparatus of claim 14 wherein said deformable means resists movement of said cart in the direction of travel of said cart.

22. The apparatus of claim 21 wherein said deformable means resists movement of said cart in a direction transverse to the direction of travel of said cart.

23. The apparatus of claim 14 wherein said deformable means comprise elastomeric means.

24. A belt for towing a multiple-wheeled device over terrain, said belt configured to be attached to a handle of the device, said belt comprising:
   a belt member configured to be attached to the waist of a user, said belt member comprising an opening formed therein; and
   a belt engaging member comprising a base at a first end and a coupling device proximate a second end, the first end of said belt engaging member having a diameter larger than that of the second end, defining a ridge, said opening of said belt member sized to engage the ridge, a remainder of said belt engaging member comprising a deformable material configured for insertion through said opening of said belt member.

25. A belt according to claim 24 further comprising a retention member, said retention member configured for attachment to said belt member after insertion of said belt engaging member, to maintain a position of said belt engaging member within said opening of said belt member.

26. A belt according to claim 25 wherein said retention member comprises a piece of material attached to said belt member, said material of a size to enclose said base of said belt engaging member between said opening of said belt member and said material.

27. A belt according to claim 24 wherein said belt engaging material comprises a hollow core, parameters of said hollow core partially defining deformation properties of said deformable material.

28. A belt according to claim 24 wherein said coupling device is configured for attachment to a mating coupling device, the mating coupling device capable of attachment to a handle of the multiple-wheeled device.

29. A belt engaging device, said device configured for insertion through an opening formed in a belt and for attachment to a golf bag cart handle for the towing of a multiple-wheeled golf bag cart over terrain, said belt engaging device comprising:
 a first end defining a base, the base enlarged to engage the belt about a perimeter defined by the opening formed in the belt; and
 a second end further comprising a coupling device, for attachment to the golf bag cart handle, said second end configured to pass through said opening in said belt such that the enlarged base engages the defined perimeter, said belt engaging device comprising a deformable material for controlling movement of the cart while the cart is being towed and dampening forces transmitted between the cart and a user wearing the belt.

30. A belt engaging device according to claim 29 wherein the deformable material comprises an elastomeric material.

31. A belt engaging device according to claim 29 further comprising a hollow core, parameters of said hollow core partially defining deformation properties of said belt engaging device.

32. A belt engaging device according to claim 29 wherein said second end has a diameter larger than that of said first end, defining a ridge, the opening formed in the belt sized to engage the ridge.

33. A belt engaging device according to claim 29 wherein said coupling device comprises:
 a first member configured to be affixed to a handle of a golf bag cart;
 a second member affixed to said belt engaging device; and
 a pivot member disposed between said first and second members to allow a pivoting movement of said first member with respect to said second member.

34. A belt engaging device according to claim 33 wherein said second member is molded within said belt engaging device proximate said second end.

35. A belt engaging device according to claim 29 wherein said coupling device comprises:
 a first member configured to be affixed to a handle of a golf bag cart;
 a second member configured to be attached to said first member; and
 a spherical member rotatably mounted within said belt engaging device, said second member extending from said spherical member and through an opening in said second end of said belt engaging device.

36. A belt engaging device according to claim 35 wherein said belt engaging device is substantially hollow, said belt engaging device further comprising a cylindrical member disposed within the hollow portion, said cylindrical member extending from said first end of said belt engaging device towards said second end, said spherical member having a diameter such that it is configured to rest on said cylindrical member.

37. A belt engaging device according to claim 36 wherein said spherical member comprises a bore therethrough, said bore for attachment of said second member, said second member extending through said bore such that a rotation of said spherical member is limited when said a portion of said second member engages said cylindrical member.

38. A belt engaging device according to claim 29 wherein said coupling device comprises:
 a loop embedded in said second end of said belt engaging device; and
 a strap, said strap configured to provide an attachment between a golf bag cart handle and said loop.

39. A belt engaging device according to claim 29 wherein said coupling device comprises a first member configured to be affixed to a handle of a golf bag cart, said first member comprising one of a member for insertion into the golf bag cart handle and an assembly configured for clamping around the golf bag cart handle.

40. An interface between a belt to be worn by a user and a golf bag cart handle, said interface comprising:
 a belt engaging device, a first end of said belt engaging device configured to engage the belt, a second end of said belt engaging device configured to extend toward the golf bag cart handle, said belt engaging device comprising an elastomeric material for dampening along multiple axes forces transmitted between the golf bag cart handle and a user wearing the belt; and
 a coupling device configured to extend from the second end of said belt engaging device to provide an attachment to the golf bag cart handle wherein said coupling further comprises a first member configured to be affixed to a handle of a golf bag cart; a second member configured to be attached to said first member; and a spherical member rotatably mounted within said belt engaging device, said second member extending from said spherical member and through an opening in the second end of said belt engaging device.

41. An interface according to claim 40 wherein said coupling device comprises:
 a first member configured for attachment to the golf bag cart handle; and
 a second member configured for attachment to said first member, said second member retained by said belt engaging device.

42. An interface according to claim 40 wherein said belt engaging device is substantially hollow, said belt engaging device further comprising a cylindrical member disposed within the hollow portion, said cylindrical member extending from said first end of said belt engaging device towards said second end, said spherical member having a diameter such that it is configured to rest on said cylindrical member.

43. An interface according to claim 42 wherein said spherical member comprises a bore therethrough, said bore for attachment of said second member, said second member extending through said bore such that a rotation of said spherical member is limited when said a portion of said second member engages said cylindrical member.

44. An interface according to claim 40 wherein said first member comprising one of a member for insertion into the golf bag cart handle and an assembly configured for clamping around the golf bag cart handle.

* * * * *